United States Patent [19]

Ozawa et al.

[11] Patent Number: 5,105,795
[45] Date of Patent: Apr. 21, 1992

[54] FUEL INJECTION SYSTEM FOR ENGINE

[75] Inventors: Toshikazu Ozawa; Takafumi Fukuda, both of Iwata, Japan

[73] Assignee: Yamaha Hatsudoki Kabushiki Kaisha, Iwata, Japan

[21] Appl. No.: 714,216

[22] Filed: Jun. 12, 1991

[30] Foreign Application Priority Data

Jun. 13, 1990 [JP] Japan .................. 2-156517

[51] Int. Cl.$^5$ .................. F02B 23/10; F02B 3/02; F02B 5/00
[52] U.S. Cl. .................. 123/661; 123/285; 123/298; 123/305; 123/310
[58] Field of Search .................. 123/257, 268, 269, 275, 123/285, 298, 305, 310, 661

[56] References Cited

U.S. PATENT DOCUMENTS

| 2,511,992 | 6/1950 | Quick | 123/285 X |
| 2,763,254 | 9/1956 | Klug | 123/661 |
| 2,832,324 | 4/1958 | Barber | 123/298 X |
| 2,980,094 | 4/1961 | Müller | 123/661 X |
| 4,421,081 | 12/1983 | Nakamura et al. | 123/661 X |
| 4,844,025 | 7/1989 | Sheaffer | 123/661 X |
| 4,920,937 | 5/1990 | Sasaki et al. | 123/298 X |
| 4,958,604 | 9/1990 | Hashimoto | 123/305 X |

FOREIGN PATENT DOCUMENTS

| 0128417 | 8/1983 | Japan | 123/661 |
| 0035011 | 2/1989 | Japan | 123/661 |

Primary Examiner—Willis R. Wolfe
Attorney, Agent, or Firm—Ernest A. Beutler

[57] ABSTRACT

Several embodiments of combustion chamber and fuel injection systems for internal combustion engines wherein the combustion chamber is formed by a dome shape recess having a steeply inclined wall and a more shallowly inclined wall. The walls intersect along a line that is disposed closer to the more steeply inclined wall and fuel injector is positioned substantially at this line. In one embodiment, the fuel injector is inclined to spray toward the steeper wall. Various arrangements for forming the combustion chamber recess are disclosed.

29 Claims, 5 Drawing Sheets

FUEL INJECTION SYSTEM FOR ENGINE

BACKGROUND OF THE INVENTION

This invention relates to a fuel injection system for an engine and more particularly to an improved fuel injection system and combustion chamber configuration that permits good combustion efficiency under all running conditions and particularly at idle and low speed conditions.

It is readily realized that the combustion efficiency, fuel economy and exhaust emission control for an engine can be improved through the expediency of using direct cylinder fuel injection. The advantages of direct cylinder injection are particularly advantageous in two-cycle engines. However, when direct cylinder fuel injection is employed, the amount of fuel injected at idle and low speed conditions is quite small. Therefore, it is important to insure that there is a stoichiometric mixture present at the gap of the spark plug at the time the plug is fired under these running conditions. Although various arrangements have been proposed to assure this, none of the systems have been completely effective.

It is, therefore, a principal object of this invention to provide a fuel injection system for an engine wherein it will be insured that the charge is fired under all running conditions and particularly under idle.

It is a further object of this invention to provide an improved combustion chamber and fuel injection system for an engine that will insure rapid flame propagation under all running conditions and particularly under idle.

In addition to insuring that the charge is effectively ignited under all conditions and particularly idle, it is also desirable to insure that the flame propagation is very rapid. It has been found that one of the principle difficulties with maintaining good idle running is the normally slow flame propagation that results under this condition.

It is, therefore, a further object of this invention to provide an improved injection and combustion chamber system for an engine that will insure rapid flame propagation at idle.

In conjunction with the ignition system for internal combustion engines, it has been proposed to employ two spark plugs per combustion chamber. Normally two spark plugs are employed so that it will be insured that the flame propagates completely across the combustion chamber under all conditions. That is, it is the conventional practice to position the two spark plugs at spaced locations within the combustion chamber and wherein each initiates a flame front which will join and insure complete combustion. However, it has been discovered that by positioning two spark plugs in the same general area of the combustion chamber but at slightly spaced locations relative to each other it can be insured that a small, partially stratified, charge can be ignited under all conditions. It is, therefore, a further object of this invention to provide such an arrangement.

SUMMARY OF THE INVENTION

A first feature of this invention is adapted to be embodied in a combustion chamber for an internal combustion engine having relatively movable components defining a combustion chamber. The combustion chamber, when at minimum volume, is characterized in providing a recessed area having a mouth facing an enlarged area forming a squish area. The recessed area is defined by a pair of facing inclined walls. A first of the walls has a substantially steeper slope than the other of the walls. The walls converge toward an apex. A fuel injector is positioned substantially at the apex and sprays fuel generally downwardly between the walls. A spark plug is positioned with its gap contiguous to the first wall.

A further feature of the invention is adapted to be embodied in a combustion chamber for an internal combustion engine with a pair of spark plugs having their gaps extending into the combustion chamber in the same general area. However, the spark plugs have their gaps spaced slightly from each other so that they will insure ignition of a stratified charge.

DETAILED DESCRIPTION OF THE PREFERRED EMBODIMENTS OF THE INVENTION

Figure 1:
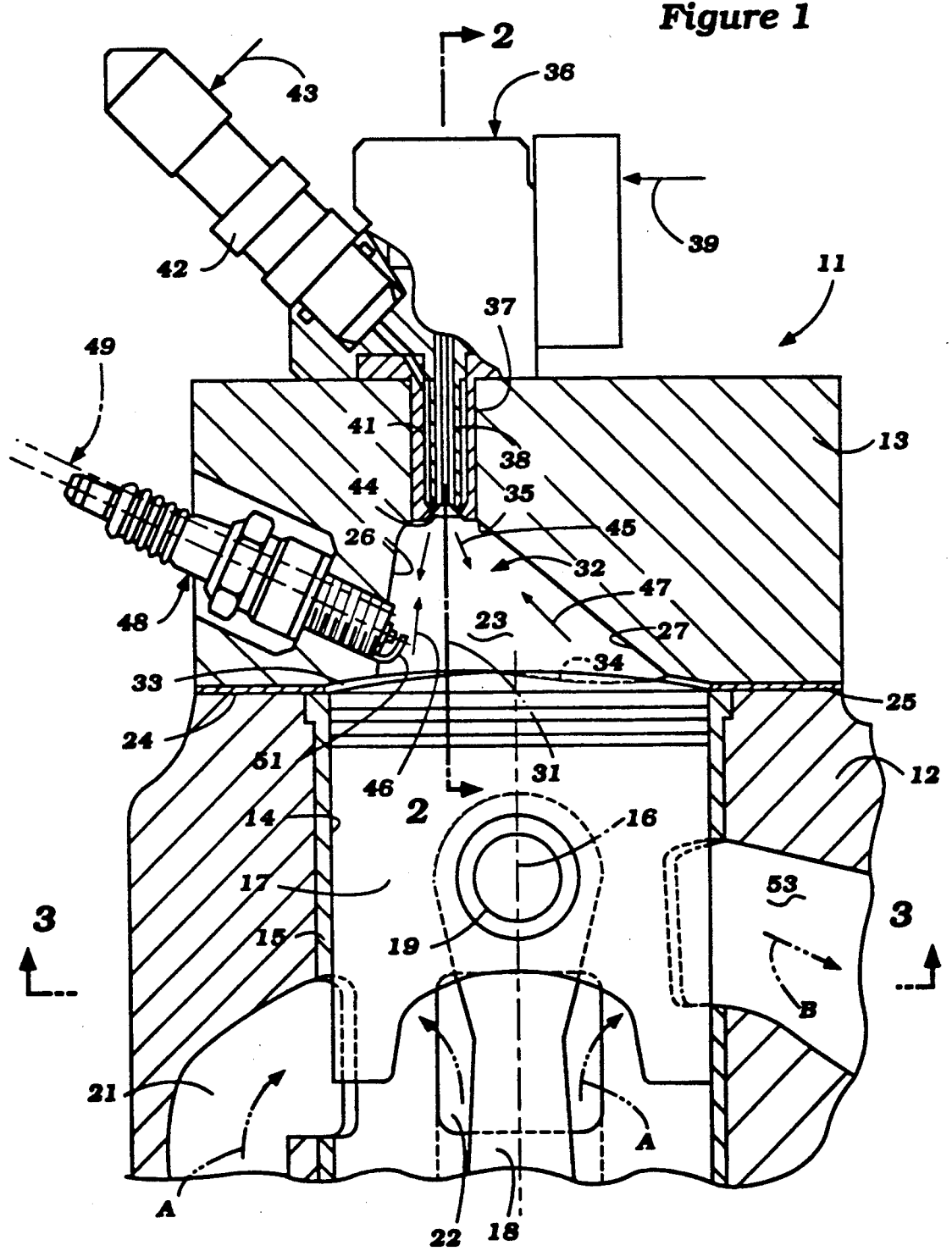
FIG. 1 is a cross-sectional view taken through a single cylinder of an internal combustion engine and shows the combustion chamber configuration and which engine is constructed in accordance with a first embodiment of the invention.
Figure 2:
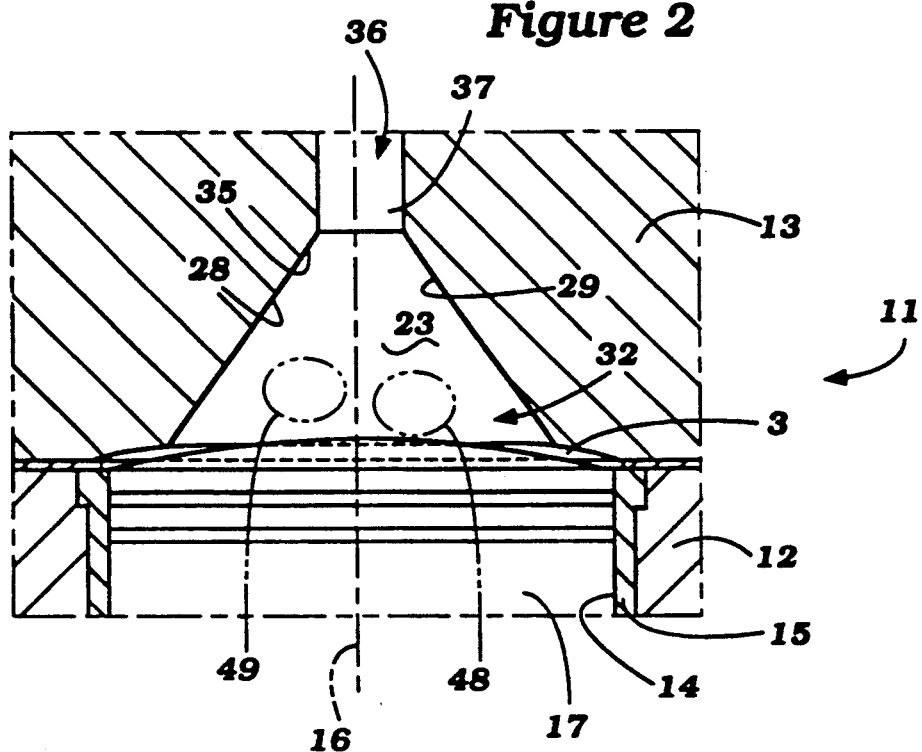
FIG. 2 is a cross-sectional view taken along the line 2—2 of FIG. 1.
Figure 3:
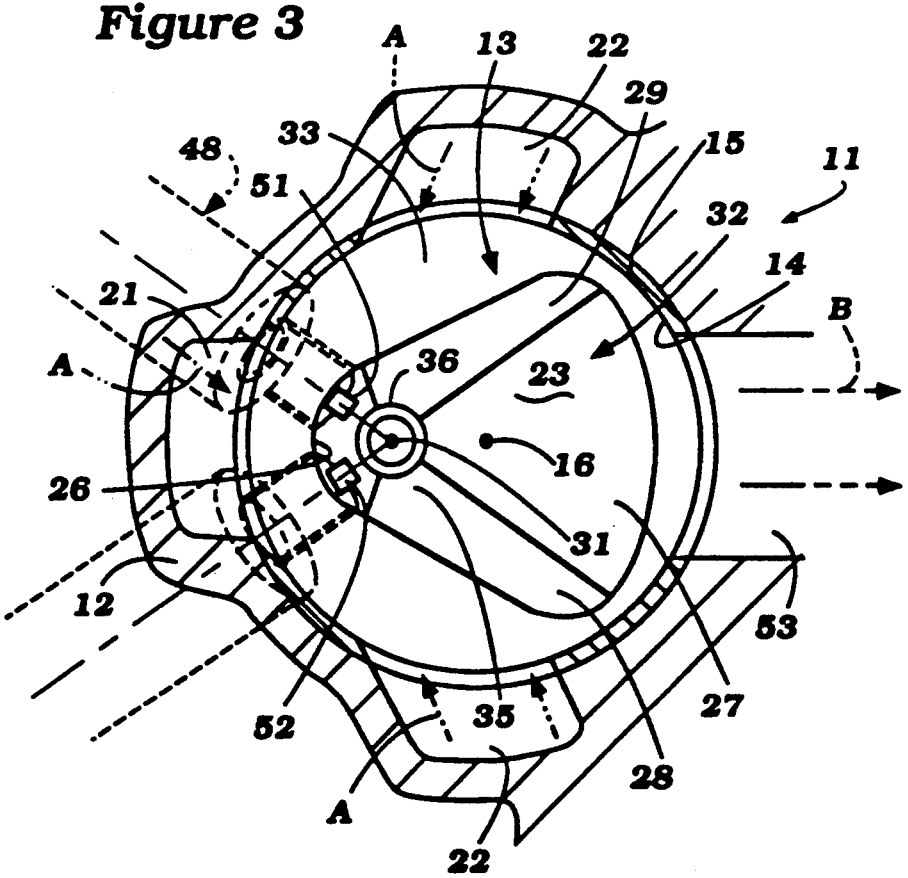
FIG. 3 is a cross-sectional view taken along the line 3—3 of FIG. 1.

Referring first to the embodiment of FIGS. 1 through 3, a single cylinder of an internal combustion engine is depicted partially and is identified generally by the reference numeral 11. The invention is described in conjunction with a single cylinder of the engine since it will be readily apparent to those skilled in the art how the invention can be employed with multiple cylinder engines Also, although the invention is described in conjunction with a reciprocating engine, it should be understood by those skilled in the art that certain facets of the invention can be employed with engines of the non-reciprocating type. In the illustrated embodiment, the engine is depicted as being operated on the two stroke crankcase compression principle. The invention has particular utility in conjunction with said engines but may also be employed with engines operating on other cycles.

The engine 11 is comprised of a cylinder block 12 to which a cylinder head 13 is affixed in a suitable manner. The cylinder block 12 is provided with a cylinder bore 14 that is defined by a pressed or cast in liner 15. The axis of the cylinder bore 14 is shown in the drawings and is identified by the reference numeral 16.

A piston 17 is supported for reciprocation within the cylinder bore 14 and is connected to the upper end of a connecting rod 18 in a known manner, by means of a piston pin 19. The lower end of the connecting rod 18 is connected to a crank shaft (not shown) that is rotatably journaled within a crankcase chamber positioned beneath the cylinder bore 14. Since the invention deals with the combustion chamber shape and the manner and arrangement of the fuel injection, the lower end of the engine is not depicted. Those skilled in the art will readily understand how any conventional construction can be employed in conjunction with the crankcase chamber.

An air charge is introduced into the crankcase chamber through an induction system of any known type during the upward movement of the piston 17 within the cylinder bore 14. This charge is then compressed as the piston 17 descends and the compressed charge is transferred into a combustion chamber, as will be hereinafter defined, by means of a plurality of circumferentially spaced scavenge passages including a main scavenge passage 21 and a pair of side scavenge passages 22. These scavenge passages are formed in the cylinder block 12 and terminate in scavenge ports formed in the liner 15. The path of air flow into the combustion chamber from the scavenge passages 21 and 22 is indicated in FIGS. 1 and 3 by the dot dash arrows A.

In this embodiment of the invention, a recess, indicated generally by the reference numeral 23 is formed in the cylinder head 13 inwardly of an outer peripheral sealing surface 24 that engages a gasket 25 interposed between the cylinder head 13 and cylinder block 12 in a known manner. As may be readily seen in the Figure, the recess 23 is formed by a pair of walls, which are generally arcuate and which are identified by the reference numerals 26 and 27, respectively. It should be noted that the walls 26 and 27 have a different inclination to the cylinder bore axis 16 with the walls 26 being much more steeply inclined than the wall 27. The walls 26 and 27 blend into side walls 28 and 29 which have a generally fan shape in plan view so as to provide a combustion chamber which generally expands in volume from the wall 26 toward the wall 27. The walls 26 and 27 generally intersect along a line, indicated by the phantom line and identified by the reference numeral 31. This intersecting line 31 is parallel to the cylinder bore axis 16 but offset toward the side of the main scavenge passage 21.

The recess 23 forms a part of a combustion chamber, indicated generally by the reference numeral 32 which is comprised of the recess 23 and the remaining area within the cylinder bore 14 and above the head of the piston 17. At top dead center, as shown in FIGS. 1 and 2, there is a small swish area 33 that generally encircles the recess 23 and which is defined around the periphery of the recess.

The head of the piston 17 may be formed with a recessed area 34 which is positioned in facing relationship to the shallowly inclined wall 27 and which has a shape that is complementary to the fan shape of the cylinder head recess 23 so as to provide an area for further gas expansion, as will be described.

At the head of the recess 23 there is provided a dome area 35 which is generally circular and which lies around the line 31. A fuel injector of any known type, indicated generally by the reference numeral 36 is supported in the cylinder head 13 in an appropriate manner and has its discharge axis generally parallel and coincident with the line 31 and in a perpendicular direction to the cylinder bore 14. However, it is to be understood that the axis may be slightly inclined so as to converge toward the more steeply inclined wall 26, as will be described later in conjunction with another embodiment of the invention.

In the illustrated embodiment, the fuel injector 36 is of the air fuel injector type. However, it is to be understood that the injector 36 may inject only fuel. Although, as has been noted, any form of fuel injector may be employed, the injector 36 may be an air/fuel injector of the type disclosed in copending application of Motoyama Yu, entitled "Air Fuel Injector Assembly", Ser. No. 591,960, filed Oct. 2, 1990, still pending, and assigned to the assignee hereof, the disclosure of which is herein incorporated by reference. Basically, the injector 36 includes a body portion 37 having an air chamber 38 to which air is introduced under pressure by an air line 39 and a fuel chamber 41 to which fuel is introduced by a fuel injector 42 supplied by a fuel line 43. An injection valve 44 is controlled by an electrical solenoid (not shown) so as to control the admission of air and fuel into the combustion chamber 32 in a direction generally indicated by the arrows 45.

The amount of fuel discharged into the combustion chamber when the injection valve 44 is open is controlled by changing the time in which the injection valve 44 is open. In addition, the initiation of the opening of the injection valve 44 and its closing varies in relation to engine load. Generally, injection at idle is such that injection will begin when the piston 17 is nearly at its top dead center position and completed before top dead center is reached. Thus, all of the fuel injected will be concentrated in the cylinder head cavity 23. At this time, there will be a squish air flow into the recess 23 in a generally steep direction as indicated by the arrow 46 in FIG. 1 and in a more inclined direction as indicated by the arrow 47 from the squish area 33 into the recess 23. Because the fuel injector is disposed closer to the steeply inclined wall 26, more fuel will tend to accumulate in this area and this coupled with the squish action, aforedescribed, will insure that the fuel is stratified toward this side of the combustion chamber. The reason for this will now be described.

A pair of spark plugs, 48 and 49 are mounted within the cylinder head 13 generally in the same area. The spark plugs 48 and 49 have their respective gaps 51 and 52 disposed adjacent the peripheral surface of the wall 26 but spaced slightly different distances from the cylinder head sealing surface 24. As a result, these spark plugs 48 and 49 will be positioned so that they are at slightly different positions and will insure ignition of the small fuel charge present at idle regardless of the condition. That is, the slight offsetting of the gaps 51 and 52 will insure that the at least one of them will be in proximity to the stratified fuel charge at idle and insure ignition.

After the charge ignites it will expand outwardly as the flame front progresses the toward the greater area of the combustion chamber 32 and thus there will be insured rapid flame propagation, smooth combustion and complete combustion. The piston 17 will then be driven downwardly and eventually an exhaust port 53 formed in the cylinder block 12 in opposition to the main scavenge passage 21 will be open and the gases can exhaust in the direction indicated by the arrows B. Thus, it should be readily apparent that the described construction will insure good fuel stratification and ignition even under the extreme idle condition.

As the speed and or load of the engine increase, the beginning of fuel injection will be advanced and the duration will be extended. The condition is such, as will be described in conjunction with a later embodiment, that under high speed high load condition the fuel injection will begin at the time immediately before or about when the exhaust port 53 is opened and will be concluded some time after the exhaust port as been fully opened and after it is begun to close. Of course, the variation in timing can be chosen to suit a particular application. However, in accordance with a feature of the invention, the idle fuel injection is initiated when the piston is near top dead center to insure the positioning of the stoichiometric charge at the gaps of the spark plugs when they are fired.

Figure 4:
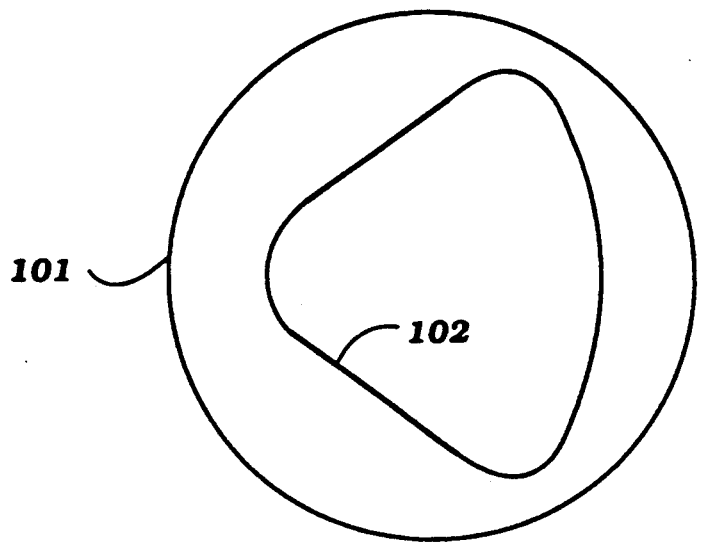
FIG. 4 is a top plan view of a piston constructed in accordance with another embodiment of the invention.
Figure 5:
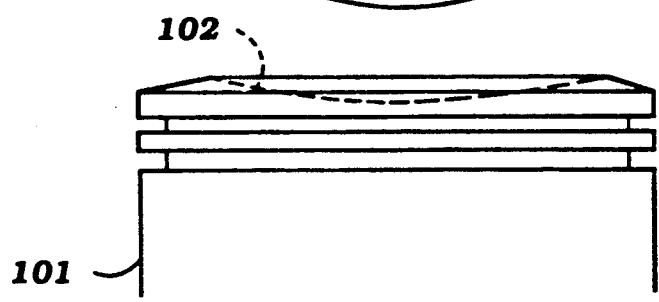
FIG. 5 is a side elevational view of the head of the piston of this embodiment.

In the embodiment thus far illustrated, the bulk of the combustion chamber has been formed by a recess in the cylinder head 13 with a small recess being formed in the piston. FIGS. 4 and 5 show another embodiment of the invention wherein the combustion chamber recess in the piston is enlarged and in this embodiment the piston is identified generally by the reference numeral 101. Since the bulk of the combustion chamber configuration is as already been described, only an illustration of the piston is believed to be necessary. It should be noted that the head of the piston 101 is formed with a recess 102 that has a generally fan shape in top plan and which is generally symmetrical in side elevation as shown in FIG. 5.

Figure 6:
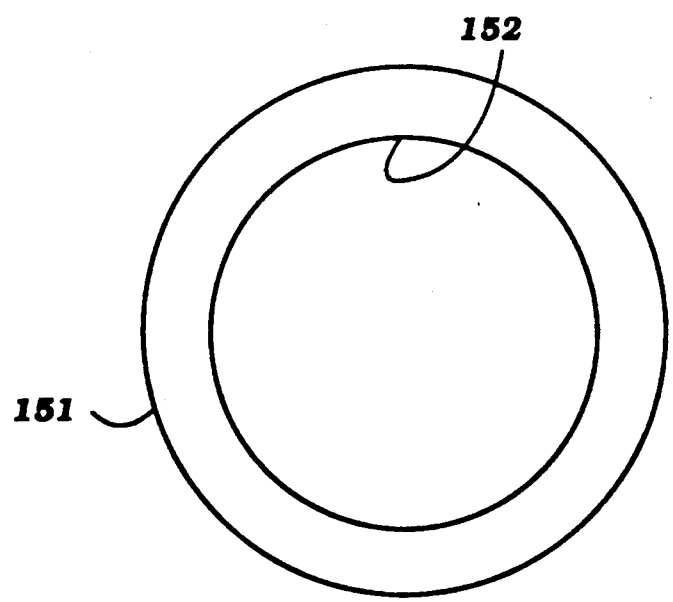
FIG. 6 is a top plan view, in part similar to FIG. 4, of a piston constructed in accordance with another embodiment of the invention.

FIG. 6 shows a piston 151 in accordance with another embodiment wherein the head of the piston 151 is formed with a semi-spherical recess 152.

Figure 7:
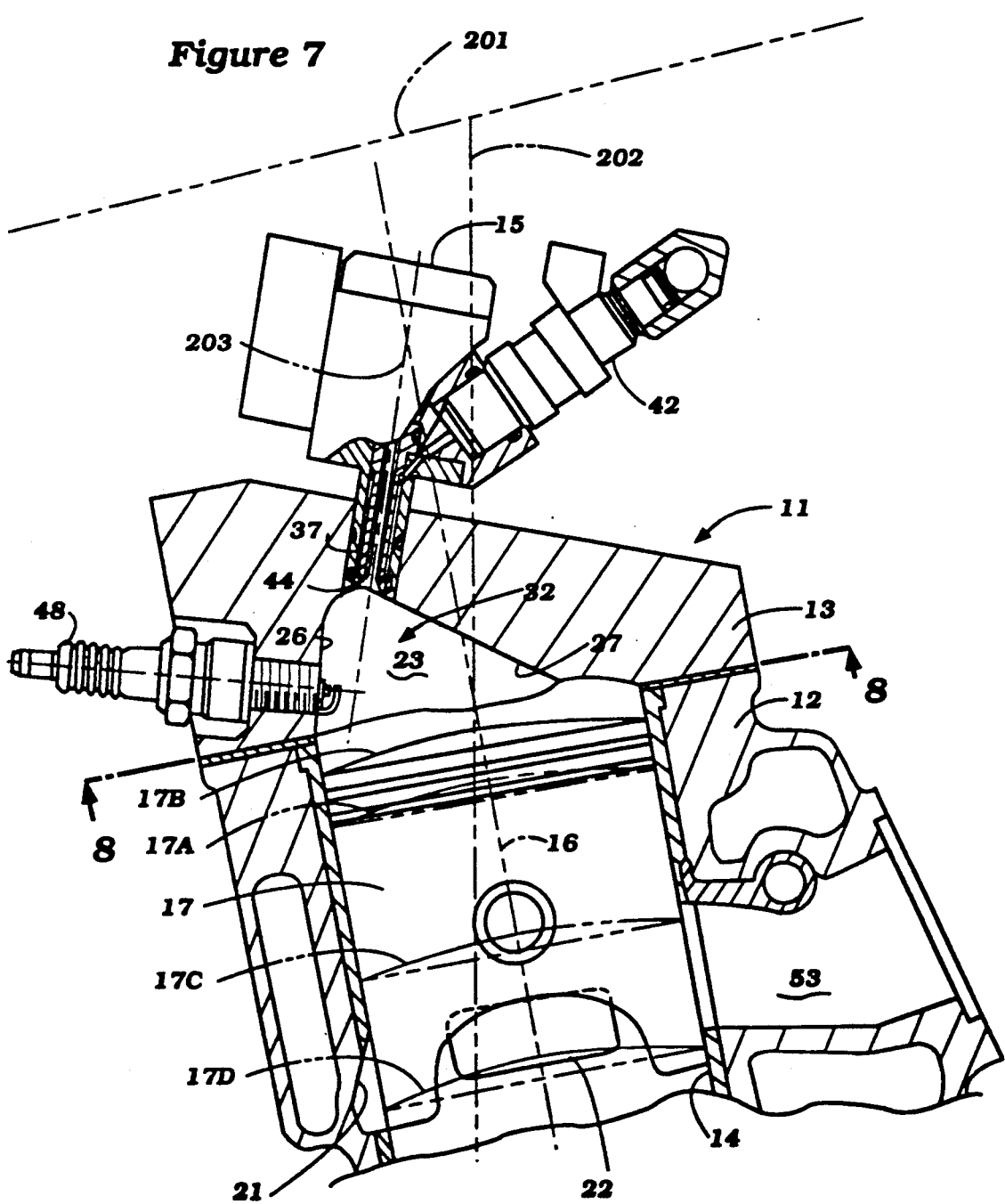
FIG. 7 is a cross-sectional view, in part similar to FIG. 1, taken through a single cylinder of an engine constructed in accordance with another embodiment of the invention.
Figure 8:
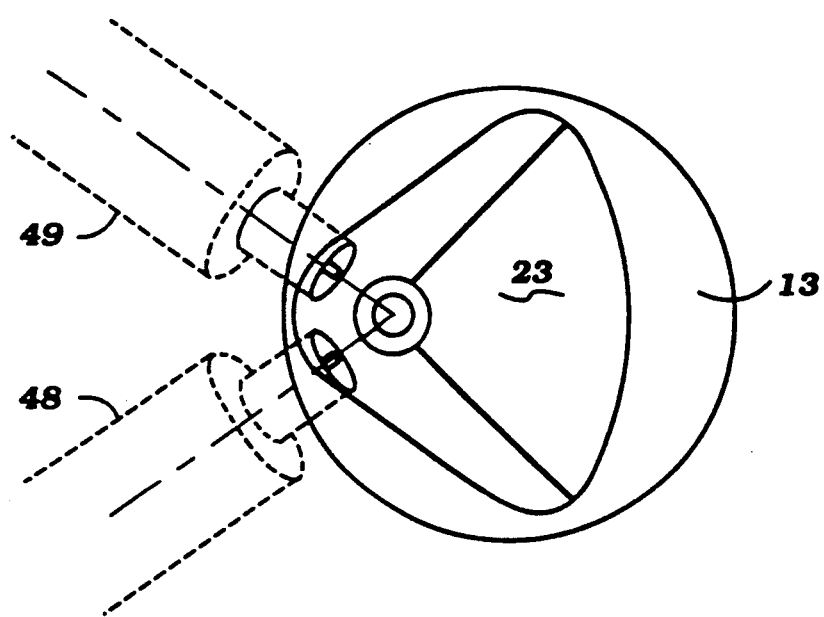
FIG. 8 is a cross-sectional view taken along the line 8—8 of FIG. 7.

In the embodiments of the invention as thus far described, the fuel injector 36 has been disposed so that it spray axis is generally along an axis that is parallel to the cylinder bore axis and along the intersecting line of the walls 26 and 27. However, as has been noted, there may be some advantages in certain applications to inclining the axis of the fuel injector 36 so that it sprays more directly toward the steeply inclined wall 26 and FIGS. 7 and 8 show such an embodiment. In this embodiment, the basic construction of the engine 11 is the same as that previously described and, for that reason, components of the engine which are the same or substantially the same as the previously described embodiment have been identified by the same reference numeral and will be described again only insofar as is necessary to understand the construction and operation of this embodiment.

In this embodiment, the engine 11 is designed to be positioned transversely in a front engine compartment of a motor vehicle having a downwardly sloping hood, indicated generally by the reference numeral 201. In order to permit a low hood line, the cylinder bore axis 16 is canted at an acute angle forwardly relative to a vertical line 202. In order to further permit not only a low hood line but also ensure fuel impingement on the steeply inclined wall 26 of the combustion chamber recess 23, the fuel injector 15 is inclined so that its spray axis 203 is at an angle to the cylinder bore axis 16 and the intersecting line between the walls 26 and 27 and at a slight angle to the vertical axis 202. In this way, the aforenoted results will be obtained.

In this figure, the various piston head locations relative to the fuel injection timing events are also illustrated so as to further understand the injection timing, as aforedescribed. The phantom line 17A indicates the position of the piston 17 when idle fuel injection is begun and the solid line view 17B shows the piston head position when idle injection is completed. It will be noted that under these conditions, the fuel is injected at an area when the clearance volume is quite small and it will be ensured that the bulk of the fuel will be retained within the recess 23. Furthermore, the squish action will cause the fuel to be swept back into the recess and up the steepwardly inclined wall 26 toward the gaps of the spark plugs 48 and 49.

The phantom line view 17C indicates the point when fuel injection is begun under high load conditions and this is, as will be apparent, begun at approximately the time when the exhaust port 53 is opened. The phantom line view 17D indicates when fuel injection is stopped under maximum load conditions. These respective angles may be at 100° and 190° after top dead center. Although injection begins at this time when the exhaust port is opened, fuel is not likely to pass out of the open exhaust port since the exhaust port is spaced a substantial distance from the fuel injector 15.

It should be readily apparent from the foregoing description that the described embodiments are very effective in ensuring good fuel economy, complete combustion, and rapid flame propagation under all conditions including the extreme idle condition. Of course, the embodiments in the invention illustrated and described are only preferred forms in which the invention may take and various changes and modifications may be made without departing from the spirit and scope of the invention, as defined by the appended claims.

We claim:

1. A combustion chamber for an internal combustion engine having relatively movable components defining said combustion chamber, said combustion chamber at minimum volume being characterized in providing a recessed portion having a mouth facing an enlarged area forming a squish area, said recessed area being defined by a pair of facing inclined walls, a first of said walls having a substantially steeper slope than the other of said walls, said walls converging toward an apex, a fuel injector positioned substantially at said apex and spraying fuel generally downwardly between said walls, and a spark plug having its gap disposed contiguous to said first wall.

2. A combustion chamber according claim 1 wherein the recess is generally fan shape in plan view.

3. A combustion chamber according claim 2 wherein the first and second walls are generally curved in plan and extend into the sides of the fan shape.

4. A combustion chamber according to claim 3 wherein there are a pair of spark plugs having their gap disposed in the first wall in close proximity to each other.

5. A combustion chamber according to claim 4 wherein the spark plug gaps are positioned at different locations along the wall.

6. A combustion chamber according to claim 3 wherein there are provided means for controlling the timing of fuel injection and fuel injection is begun at idle when the chamber is approaching its minimum volume and completed slightly before the chamber reaches its minimum volume.

7. A combustion chamber according to claim 1 wherein the fuel injector is disposed closer to the first wall than the second wall.

8. A combustion chamber according to claim 1 wherein the engine is a reciprocating engine and the combustion chamber is defined by a recess formed in the cylinder head and a head of a piston reciprocating in a cylinder bore, the recessed area being formed primarily in said cylinder head.

9. A combustion chamber according to claim 8 wherein the recess is generally fan shape in plan view.

10. A combustion chamber according to claim 9 wherein the first and second walls are generally curved in plan and extend into the sides of the fan shape.

11. A combustion chamber according to claim 10 wherein there are a pair of spark plugs having their gap disposed in the first wall in close proximity to each other.

12. A combustion chamber according to claim 11 wherein the spark plug gaps are positioned at different locations along the wall.

13. A combustion chamber according to claim 12 wherein there are provided means for controlling the timing of fuel injection and fuel injection is begun at idle when the chamber is approaching its minimum volume and completed slightly before the chamber reaches its minimum volume.

14. A combustion chamber according to claim 13 wherein the fuel injector is disposed closer to the first wall than the second wall.

15. A combustion chamber according to claim 8 wherein the engine operates on the two stroke crankcase compression principle and wherein there are scavenge ports formed in the cylinder for admitting a charge to the chamber and an exhaust port formed in the cylinder bore for discharging the charge from the chamber and wherein the first wall is spaced farther from the exhaust port than the second wall.

16. A combustion chamber according to claim 15 wherein the recess is generally fan shape in plan view.

17. A combustion chamber according to claim 16 wherein the first and second walls are generally curved in plan and extend into the sides of the fan shape.

18. A combustion chamber according to claim 17 wherein there are a pair of spark plugs having their gap disposed in the first wall in close proximity to each other.

19. A combustion chamber according to claim 18 wherein the spark plug gaps are positioned at different locations along the wall.

20. A combustion chamber according to claim 19 wherein there are provided means for controlling the timing of fuel injection and fuel injection is begun at idle when the chamber is approaching its minimum volume and completed slightly before the chamber reaches its minimum volume.

21. A combustion chamber for an internal combustion engine having relatively movable components defining a combustion chamber, said combustion chamber at minimum volume being characterized in providing a recessed area having a mouth facing an enlarged area forming a squish area, first and second spark plugs positioned within the combustion chamber with their gaps located at the same area but different locations within the recessed area.

22. A combustion chamber according to claim 21 wherein the recess is generally fan shape in plan view.

23. A combustion chamber according to claim 22 wherein the recessed are is defined by first and second walls generally curved in plan view and extend into the sides of the fan shape and the spark plugs have their gaps in the first wall.

24. A combustion chamber according to claim 5 wherein the locations are at different heights.

25. A combustion chamber according to claim 12 wherein the locations are at different heights.

26. A combustion chamber according to claim 19 wherein the there are a pair of spark plugs having their gap disposed in the first wall in close proximity to each other.

27. A combustion chamber according to claim 21 wherein the locations are at different heights.

28. A combustion chamber according to claim 27 wherein the including a fuel injector mounted within said recessed area and spraying toward the gaps of the spark plugs.

29. A combustion chamber according to claim 21 wherein the including a fuel injector mounted within said recessed area and spraying toward the gaps of the spark plugs.

* * * * *